US008490866B1

(12) United States Patent
Aibazov

(10) Patent No.: US 8,490,866 B1
(45) Date of Patent: Jul. 23, 2013

(54) PAYMENT CARD

(76) Inventor: Oleg Umarovich Aibazov, Moscow (RU)

( * ) Notice: Subject to any disclaimer, the term of this patent is extended or adjusted under 35 U.S.C. 154(b) by 0 days.

(21) Appl. No.: 13/519,084

(22) PCT Filed: Dec. 9, 2010

(86) PCT No.: PCT/RU2010/000741
§ 371 (c)(1), (2), (4) Date: Oct. 22, 2012

(87) PCT Pub. No.: WO2011/081563
PCT Pub. Date: Jul. 7, 2011

(30) Foreign Application Priority Data

Dec. 30, 2009 (RU) ................................ 2009149148

(51) Int. Cl.
*G06Q 40/00* (2012.01)
*G07D 11/00* (2006.01)
*G07F 19/00* (2006.01)
*G06K 5/00* (2006.01)
*G06K 19/00* (2006.01)
*G06K 19/06* (2006.01)

(52) U.S. Cl.
USPC ........... 235/379; 235/380; 235/487; 235/492; 235/493; 705/41

(58) Field of Classification Search
USPC ..... 235/487, 492, 493, 381, 379–380; 705/41
See application file for complete search history.

(56) References Cited

U.S. PATENT DOCUMENTS

| | | | | |
|---|---|---|---|---|
| 3,793,600 | A * | 2/1974 | Grosbard | 235/491 |
| 4,464,454 | A * | 8/1984 | Vogt | 430/256 |
| 4,499,126 | A * | 2/1985 | Suzuki et al. | 428/13 |
| 4,714,980 | A * | 12/1987 | Hara | 361/679.31 |
| 5,876,068 | A * | 3/1999 | Schneider et al. | 283/86 |
| 6,638,635 | B2 * | 10/2003 | Hattori et al. | 428/500 |
| 6,722,700 | B1 * | 4/2004 | Christen | 283/107 |
| 7,398,917 | B2 * | 7/2008 | Aibazov et al. | 235/379 |
| 2001/0046015 | A1 * | 11/2001 | Van De Witte et al. | 349/115 |
| 2002/0011014 | A1 * | 1/2002 | Lipper | 40/124.191 |
| 2002/0130186 | A1 * | 9/2002 | Lasch et al. | 235/488 |
| 2002/0145049 | A1 * | 10/2002 | Lasch et al. | 235/488 |

(Continued)

FOREIGN PATENT DOCUMENTS

| | | | |
|---|---|---|---|
| JP | 4090392 | A | 3/1992 |
| JP | 6072082 | A | 3/1994 |
| RU | 2170457 | C2 | 7/2001 |

*Primary Examiner* — Daniel Walsh
(74) *Attorney, Agent, or Firm* — Nath, Goldberg & Meyer; Jerald L. Meyer; Sanjana Mangalagiri

(57) ABSTRACT

The invention enables to improve flexibility, reliability and service life of a payment card having embedded ornamental elements. In order to achieve the technical effect, the device includes a foil layer, a first layer and a second layer, all being made laminating. The foil layer is fixed between the first layer and the second (outer) layer. The card is provided with a plastic plate, a magnetic strip, an adhesive layer, an insert made with a thickness greater than that of the foil layer and made of the same material as the foil layer. The ornamental element is fixed within the insert and flush to it. The outer surfaces of the second layer and the insert are located in a single plane, and the insert and the ornamental element are free from the second layer on the outside and are fixed in the plastic plate with the adhesive layer.

20 Claims, 1 Drawing Sheet

U.S. PATENT DOCUMENTS

2003/0019925 A1* 1/2003 Cannon et al. ................ 235/380
2003/0116633 A1* 6/2003 Clayman et al. .............. 235/488
2003/0127847 A1* 7/2003 Keller et al. .................. 283/109
2005/0247795 A1* 11/2005 Riedl et al. .................... 235/488
2005/0247797 A1* 11/2005 Ramachandran ............. 235/492
2006/0086802 A1* 4/2006 Tolkowsky .................... 235/487
2006/0292946 A1* 12/2006 Kiekhaefer ..................... 442/43
2008/0245865 A1* 10/2008 Mosteller ...................... 235/449
2008/0315384 A1* 12/2008 Jacobsen et al. .............. 257/679
2009/0250521 A1* 10/2009 Fujita et al. ................... 235/488
2011/0031318 A1* 2/2011 Lasch et al. ................... 235/491
2012/0037710 A1* 2/2012 Le Garrec et al. ............ 235/492
2012/0217305 A1* 8/2012 Yamazaki ..................... 235/488

* cited by examiner

PAYMENT CARD

This invention relates to devices for cashless payments, for example, bank payments, payments in shops, public transportation means, etc.

A VIP payment card is known, which is made from a precious metal only and is provided with an ornamental element—a precious stone attached to it (see, RU Patent No. 2244634).

Disadvantages of the said device are its high cost as well as impossibility to use it for standard ATMs, since it does not comply with the requirements to plastic cards as a payment means. Its construction is insufficiently flexible.

The closest to this invention is a card comprising a foil layer, a first layer and a second layer, these being made laminating, the foil layer being fixed between the first layer and the second (outer) layer (see, U.S. Pat. No. 5,702,554).

This device uses a golden foil layer having a thickness from 0.3 to 1 mm, which the first layer and the second layer laminate on its both sides so that the body of the plastic card looks like a golden one.

Disadvantages of this device are great consumption of the precious metal, insufficient flexibility, impossibility of providing the card with various ornamental elements.

The objective of the invention is to create a payment card with improved flexibility, reliability and life cycle, as well as to decrease metal consumption when embedding various ornamental elements into a card, therefore improving ornamentality and performance.

The said objective can be achieved and the said technical effects can be obtained by the known payment card comprising a foil layer, a first layer and a second layer, these being made laminating, the said foil layer being fixed between the said first layer and the said second (outer) layer, which, according to the claimed device, is provided with a plastic plate, a magnetic strip, an adhesive layer, an insert made to a thickness greater than that of the foil layer and produced from the same material as the foil layer, an ornamental element fixed within the insert flush with it, wherein the outer surfaces of the second layer and the insert are positioned in one plane, and the insert and the ornamental element are free from the second layer on the outside, the insert and the ornamental element are fixed within the plastic plate by an adhesive layer, the length and the width of the foil layer being selected so that they are respectively lesser than the length and the width of the plastic plate.

Additional embodiments of the device are possible, wherein it is expedient that:

- the foil layer is made of a metal;
- the foil layer is made of a precious metal;
- the foil layer is made of a metal alloy imitating a precious metal;
- the foil layer is positioned in contiguity to the insert;
- the insert is separated from the foil layer by a gap formed by the first layer and the second layer;
- the ornamental element is made of a stone;
- the stone is a natural precious stone;
- the stone is a natural semi-precious stone;
- the stone is an artificial stone;
- the stone is fianite, or transparent glass, or color glass.
- the ornamental element is made of a fluorescent material;
- the insert is made with projections for the possibility of attaching the ornamental element on the outside;
- the adhesive layer is made of a tape which both sides are covered with an adhesive;
- the foil layer is made as an ornament;

- the foil layer and/or the insert are provided with an engraving;
- the magnetic strip is attached to the plastic plate on its opposite side relative to the insert and the ornamental element;
- the foil layer thickness is in the range from 0.04 to 0.06 mm;
- the insert thickness is in the range from 0.2 to 0.25 mm;
- the ornamental element height is not more than 0.75 mm, and its maximum lateral dimension is not more than 2 mm.

The above advantages as well as specific features of the present invention will be further described on the basis of its best embodiment with reference to the accompanying drawings, wherein.

The payment card (FIG. 1, 2) comprises the foil layer 1, the first layer 2 and the second layer 3, these two made laminating. The foil layer 1 is fixed between the first layer 2 and the second (outer) layer 3.

Figure 1:
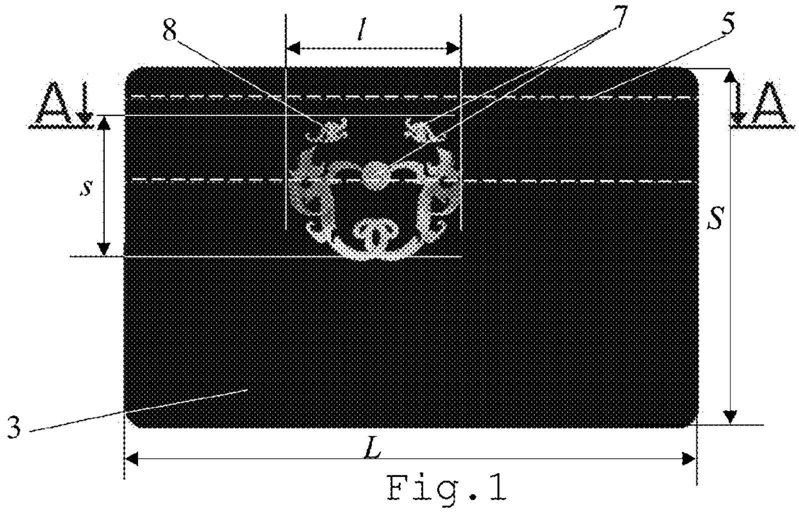
FIG. 1 shows an external appearance of the claimed device (one embodiment)
Figure 2:
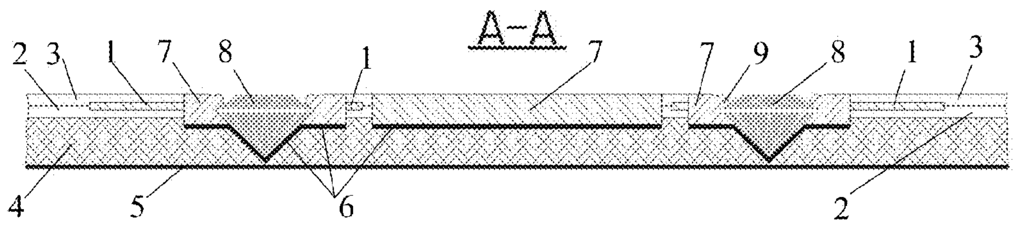
FIG. 2 shows A-A section of FIG. 1 (enlarged view and with a central insert without an ornamental element, it is shown in FIG. 1 offset and having a shape of a round insert)

The construction comprises the plastic plate 4, the magnetic strip 5, the adhesive layer 6, the insert 7 made with a thickness greater than that of the foil layer 1. The insert 7 is made of the same material as the foil layer 1. The ornamental element 8 is fixed within the insert 7 and flush with it. The outer surfaces of the second layer 3 and the insert 7 are located in a single plane. The insert 7 and the ornamental element 8 are free from the second layer 3 on the outside (FIG. 2) and are fixed in the plastic plate 4 with the adhesive layer 6. The length l and the width s of the foil layer are lesser than the length L and the width S of the plastic plate (FIG. 1).

It is appropriate that the foil layer is made of a metal for the purpose of effectively connecting the layers 2 and 3 when laminating.

The foil layer 1 may be made of a precious metal, such as gold, platinum, silver, palladium, etc.

The foil layer 1 may be made of a metal alloy imitating a precious metal, e.g., a copper alloy or an aluminum layer.

The foil layer 1 may be positioned in contiguity to the insert 7 (FIG. 2), e.g., for the insert 7 with the ornamental element 8.

The insert 7 may be separated from the foil layer 1 by a gap formed by the first and the second layers 2, 3, e.g., for the insert 7 without an ornamental element.

The ornamental element 8 may be made of a stone. This stone may be precious, semi-precious or artificial, e.g., fianite, or transparent glass, or color glass.

Furthermore, the ornamental element 8 may be made of a fluorescent material, e.g., a material capable of glowing in shade.

Figure 4:
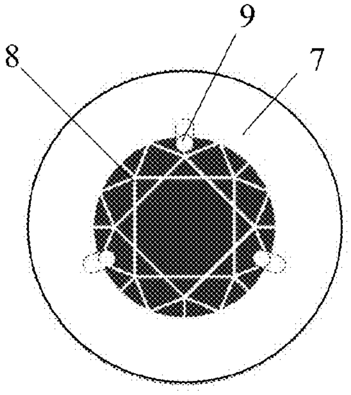
FIG. 4 shows an enlarged fragment of the insert and the ornamental element of FIG. 4.

The insert 7 is provided with projections 9 (FIGS. 2, 4) for the purpose of improving attachment reliability. The projections 9 provide for the possibility of additionally fixing the ornamental element 8 on the outside.

The adhesive layer 6 may be made of a tape (not shown) which both sides are provided with an adhesive. Tapes of this type are used by jewelers.

Figure 3:
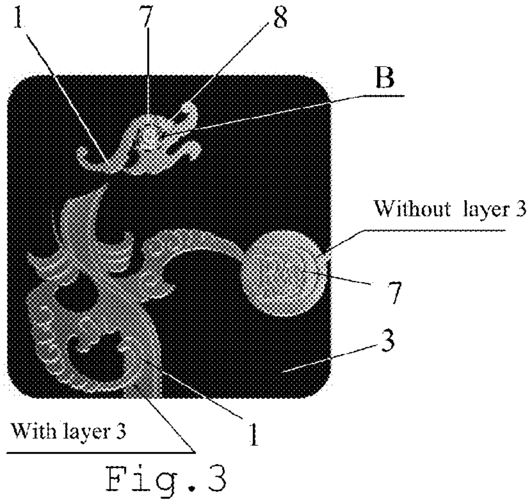
FIG. 3 shows an enlarged fragment of the foil layer, the insert and the ornamental element of FIG. 1.

In order to increase the ornamentality effect the foil layer 1 is made as an ornament (FIGS. 1, 3).

An engraving (FIG. 3) may be made on the foil layer 1 and/or the insert 7.

The insert 7 without the ornamental element 8 (FIG. 2) may be provided, for example, with a deep engraving depicting the owner's monogram (FIG. 3).

The magnetic strip 5 (FIG. 1, 2) is fixed to the plastic plate 4 on its opposite side relative to the location of the insert 7 with the ornamental element 8.

In contrast to the closest analogous solution with the foil layer having a thickness in the range from 0.3 to 1 mm, the claimed device uses the foil layer 1 having a thickness in the range from 0.04 to 0.06 mm and the insert 7 having a thickness in the range from 0.2 to 0.25 mm, i.e., a significantly lesser thickness. This helps reducing costs of the device greatly and improve its flexibility, in spite of embedding various ornamental elements into the card body.

As tests of the card for its compliance with the applicable standards have shown, the height of the ornamental element 8 should be not more than 0.75 mm and its maximum lateral dimension (e.g., the maximum diameter for a stone) should be not more than 1 mm.

The payment card may be used in a common way, for example, the user can make cashless payments, using ATMs, for which purpose the back side of the card has an information carrier, i.e., the magnetic strip 5, attached to it.

The claimed payment card can be made, with the implantation of the layers 1, the inserts 7 and the ornamental elements 8, as follows (a particular embodiment of the invention).

The process of making the payment card comprises the following steps: preparation of a metal for the layer 1; rolling, together with regular heat treatments, to a required thickness in the range from 0.04 to 0.06 mm.

Cutting of a material for the layer 1 to fragments, for example, 100×100 mm to be treated subsequently.

Engraving on and texturing the surface of the layer 1 according to a given vector for the ornament design.

Cutting the contour of the layer 1 according to the given design vector.

Positioning the layers 1 relative to the pre-marked contour together with the general design of the card is made on A3 lamination packages.

The process of laminating cards with the layer 1 and the first and the second layers 2, 3 is carried out according to the parameters similar to the lamination parameters of usual plastic plates 4. The sintering temperature is 150-160° C., time is 25-28 minutes, pressure is 30 Pa.

Cards are punched out in accordance with the applicable ISO standards.

The contour of the insert 7 is cut out according to the given design vector.

Milling the first and the second layers 2, 3 and the plastic plate 4 for making places for the insert 7 and the ornamental element 8.

Fitting the insert 7, laying an adhesive tape and subsequent heat treatment.

Fitting and implanting the ornamental element 8.

Attaching the ornamental element 8 by crushing the metal with a sharp tool (graver) and pulling it over, for example, a stone with forming the projections 9.

Engraving and texturing the surface of the insert 7 according to the given design vector.

Cutting out the contour of the insert 7 according to the given design vector. Implanting the insert 7 together with laying the adhesive tape.

The sintering process of cards with the insert 7 and the ornamental element 8 is carried out according to the parameters similar to the lamination parameters of usual plastic plates 4. The sintering temperature is 150-160° C., time is 25-28 minutes, pressure is 30 Pa.

When being sintered with a laminate, the layer 1 and the insert 7 "are buried" in the body of the plastic plate 4 of the payment card. As a result, the geometrical, mechanical and other parameters of the payment card will comply with all the requirements to using plastic cards, including their use as a pay means.

Due to the use of the thickness of the foil layer 1 and the thickness of the insert 7, which are lesser than in the closest analogous solution, it is possible to compensate for cavities formed during laying a metal, for example, gold, in the areas where it is absent, through heating, exerting pressure and using a minimum thickness of the metal.

A transparent laminate, which is applied over the foil layer 1, enables to show the effect of volume and protect the layer from mechanical damage. The absence of a laminate on the insert 7 and the ornamental element 8 enables to make the appearance better, for example, to enhance playing of their facets. By using minimum thicknesses in comparison to the closest analogous solutions for the layer 1 and the insert 7 it becomes possible to impart the tactile effect to the device with the sense of an engraved metal massive.

The claimed payment card may be most successfully used for making cashless payments through ATMs.

What is claimed is:

1. A payment card with a length and width, the payment card comprising a foil layer comprising a first material, a first layer, and a second layer, the foil layer having a length and a width and being fixedly secured between the first layer and the second layer by lamination, characterized in that the card comprises a plastic plate having a length and a width, a magnetic strip secured to the first layer, an adhesive layer securing an insert to the plastic plate, the insert comprising a thickness greater than that of the foil layer and comprising the same material as the foil layer, an ornamental element fixed within the insert, and an outer surface of the ornamental element being flush with both an outer surface of the insert and second layer, the outer surfaces of the ornamental element, insert, and second layer define a single plane, the outer surface of the ornamental element and the outer surface of the insert are devoid of the second layer, the insert and ornamental element being fixed in the plastic plate by the adhesive layer, and the length and the width of the foil layer being less than the corresponding length and width of the plastic plate, the length and width of the plastic plate is equal to the length and the width of the payment card.

2. The payment card according to claim 1, characterized in that the foil layer is made of a metal.

3. The payment card according to claim 2, characterized in that the foil layer is made of a precious metal.

4. The payment card according to claim 2, characterized in that the foil layer is made of a metal layer imitating a precious metal.

5. The payment card according to claim 1, characterized in that the foil layer is positioned in contiguity to the insert.

6. The payment card according to claim 1, characterized in that the insert is separated from the foil layer by a gap of the first and the second layers.

7. The payment card according to claim 1, characterized in that the ornamental element is made of a stone.

8. The payment card according to claim 7, characterized in that the stone is natural and precious.

9. The payment card according to claim 7, characterized in that the stone is natural and semi-precious.

10. The payment card according to claim 7, characterized in that the stone is artificial.

11. The payment card according to claim 10, characterized in that the stone is fianite, or transparent glass, or color glass.

12. The payment card according to claim 1, characterized in that the ornamental element is made of a fluorescent material.

13. The payment card according to claim 1, characterized in that projections are made on the insert for the purpose of attaching the ornamental element on the outside.

14. The payment card according to claim 1, characterized in that the adhesive layer is made of a tape having an adhesive on its both sides.

15. The payment card according to claim 1, characterized in that the foil layer is made as an ornament.

16. The payment card according to claim 1, characterized in that an engraving is made on the foil layer and/or on the insert.

17. The payment card according to claim 1, characterized in that the magnetic strip is attached to the plastic plate on its opposite side relative to the location of the insert and the ornamental element.

18. The payment card according to claim 1, characterized in that a thickness of the foil layer is selected from the range of 0.04-0.06 mm.

19. The payment card according to claim 1, characterized in that a thickness of the insert is selected from the range of 0.2-0.25 mm.

20. The payment card according to claim 1, characterized in that a height of the ornamental element is selected so as to be not more than 0.75 mm and its maximum lateral dimension is selected so as to be not more than 1 mm.

* * * * *